United States Patent [19]

Deveze

[11] Patent Number: 4,748,660
[45] Date of Patent: May 31, 1988

[54] PROCESS FOR DETERMINATION OF THE LAST INTERMEDIATE NODE IN A NETWORK OF NUMEROUS INTERCONNECTED NODES

[75] Inventor: Pascal Deveze, Puteaux, France

[73] Assignee: Jeumont-Schneider Corporation, Puteaux cedex, France

[21] Appl. No.: 749,007

[22] Filed: Jun. 26, 1985

[30] Foreign Application Priority Data

Jul. 4, 1984 [FR] France .................. 84 10612

[51] Int. Cl.$^4$ .................. H04Q 9/00; H04Q 11/00
[52] U.S. Cl. .................. 379/272; 364/514; 340/826; 340/825.8
[58] Field of Search .................. 364/514, 200, 900; 370/60, 94; 379/272, 273, 277, 292; 340/826, 827, 825.8

[56] References Cited

U.S. PATENT DOCUMENTS

| | | | |
|---|---|---|---|
| 4,081,612 | 3/1978 | Hafner | 370/60 |
| 4,317,196 | 2/1982 | Ulug | 370/60 |
| 4,317,197 | 2/1982 | Ulug | 370/94 |
| 4,334,306 | 6/1982 | Ulug | 370/94 |
| 4,375,097 | 2/1983 | Ulug | 370/94 |
| 4,466,060 | 8/1984 | Riddle | 364/200 |
| 4,470,154 | 9/1984 | Yano | 455/612 |
| 4,532,625 | 7/1985 | Stover | 370/60 |
| 4,583,088 | 4/1986 | Bux et al. | 370/93 |

FOREIGN PATENT DOCUMENTS 2320022  2/1977  France .
2366754 10/1980  France .
2453557 10/1980  France .

OTHER PUBLICATIONS

"Properties of the Eigervectors of Persymmetric Matrices with Applications to Communication Theory" by A. Cantoni et al., IEEE Transactions on Communications, vol. Com-24, No. 8, Aug. 1976, pp. 804-809.

Primary Examiner—Parshotam S. Lall
Assistant Examiner—V. N. Trans
Attorney, Agent, or Firm—Rines and Rines; Shapiro and Shapiro

[57] ABSTRACT

The present invention concerns a process and a circuit enabling determination of the last intermediate node of a pathway comprising a minimum number of nodes from the m-th node to the n-th node in a network comprising p nodes interconnected by a number of links (p being a positive whole number). The process includes steps of iterative matrix calculation and comparison of elements of the same rank of certain matrices, and is especially suitable for communications networks constituted by a number of geographically separated nodes connected to one another by communications lines.

17 Claims, 1 Drawing Sheet

PROCESS FOR DETERMINATION OF THE LAST INTERMEDIATE NODE IN A NETWORK OF NUMEROUS INTERCONNECTED NODES

BACKGROUND OF THE INVENTION

The present invention concerns a process for determination of the last intermediate node of a pathway consisting of a minimum number of nodes, within a network comprising numerous nodes interconnected by means of a number of links. It concerns also a process for establishing a routing table for each node of the network as well as a general routing table enabling routing across the network of both data communications between interconnected computers, and telephonic communications between interconnected switchboard systems. The invention is useful in a communications network constituted by a number of geographically separated nodes connected by communication lines.

In order to route a message between two distant nodes, it is often necessary to traverse various other nodes. This creates the problem of determining the pathway comprising the least possible number of intermediate links or nodes, and, in particular, the addresses of those nodes. Moreover, recognizing that certain nodes or internodal links may be saturated or out of service at any given time, it is necessary to be able to establish and to modify a communications routing table.

Modular networks having a configuration easily adaptable to specific requirements are known, as described for example in French Pat. No. 2 366 754. Also known are systems that establish waiting files in the event of saturation, as described for example in French Pat. No. 2 453 557. These networks are not adaptable to accommodate changes in their characteristics.

In French Pat. No. 2 320 022, a process is described to establish addresses of through lines by means of communications establishment telegrams transmitted by relay stations. According to this process, each time communications are established, corresponding telegrams pass through the entire communications network, with only the length of the telegrams being controlled. For this reason, the desired destination point is reached by at least one telegram. Such a process takes into account the state of each point of the network, but it suffers from the disadvantage of requiring the transmission of telegrams over the entire network, which may contribute to the saturation of the network, and it does not enable easy determination of the shortest pathway to use.

The present invention has as its goal to overcome these disadvantages.

SUMMARY OF THE INVENTION

The invention has as one of its objects a process enabling determination of the last intermediate node of a pathway comprising a minimum number of nodes, from the m-th node to the n-th node in a network containing p nodes interconnected by a number of links (p being a positive whole number).

It has also as an object a process for determination of a pathway comprising a minimum number of nodes from the m-th node to the n-th node in a network comprising p nodes interconnected by a number of links (p being a positive whole number), by carrying out an iteration of the aforementioned process for intermediate node determination. The invention has also as an object a process of establishing for a given node of the network, a message routing table localized in that node, making it possible to know instantaneously the direction to be used to proceed from the given node to any other node.

A local routing table having been determined for each node of the network, the general routing table across the network consists of the set of all local routing tables.

In summary, in an aspect of the invention corresponding to the first object above, the invention provides a process for determination of the last intermediate node of a pathway comprising a minimum number of nodes from the m-th node to the n-th node in a network comprising p nodes interconnected by a number of links (p being a positive whole number). The process may proceed as follows:

1. All direct links of the network are determined;
2. The square matrix $R_1 = \| a_{ij} \|_p$ is created, and stored in memory, such that $a_{ij}=0$ if there is no direct link from the i-th node to the j-th node, and $a_{ij}=1$ if there is a direct link from the i-th node to the j-th node;
3. The existence of at least one two-link pathway from the m-th node to the n-th node is determined, if a direct link does not exist, by comparing the elements of the same rank in the m-th row and the n-th column of this matrix $R_1$, with the existence of nonzero elements of the same in the m-th row and n-th column indicating the presence and location of at least one intermediate node of a two-link pathway;
4. In the absence of such a common nonzero element, the following steps are iterated over all q from 2 to $p-2$, until a pathway of $(q+1)$ links have been determined which joins the m-th and n-th nodes;
   a. The square matrix $X_q = R_{q-1} \cdot R_1 = \| x_{ij} \|_p$ is calculated, equal to the product of matrices $R_{q-1}$ and $R_1$;
   b. The square matrix $R_q = \| b_{ij} \|_p$ is established such that $b_{ij}=1$ if $x_{ij}$ or $a_{ij}$ is other than zero, and $b_{ij}=0$ if $x_{ij}$ and $a_{ij}$ are both zero; and
   c. The elements of the same rank of the m-th row of the matrix $R_q$ and the n-th column of the matrix $R_1$ are compared, the existence of nonzero elements indicating the presence and location of at least one last intermediate node of a pathway of $q+1$ links.

It is also possible to refine the procedure by:

1. Limiting calculation to the elements of the square matrix $X_q$ corresponding to the zero elements of the matrix $R_{q-1}$,
2. Limiting calculation to the m-th row of the matrices $X_q$ and $R_q$ for q greater than or equal to 2, and
3. If the links are not directional, calculating only the elements of the square matrix $X_q$ for values of i less than j, or values of j less than i.

According to another aspect of the invention, corresponding to the second object above, the invention provides process for determination of a pathway comprising a minimum of nodes from the m-th node to the n-th node in a network comprising p nodes interconnected by a number of links (p being a positive whole number). The process, which is especially intended for both the routing of data between interconnected computers and the routing of telephonic messages between interconnected switchboard systems, makes use of the process described above and may proceed as follows:

1. The last intermediate node of a pathway comprising a minimum number of nodes from the m-th to the n-th node is determined according to the above-outlined process, and its address is placed in memory;

2. According to the same process, the next-to-last intermediate node is determined. This node is the last intermediate node of a pathway comprising a minimum number of nodes the m-th node to the last intermediate node between the m-th node and the n-th node, the address of which has been placed in memory.

3. By iteration, the addresses of all the prior intermediate nodes are determined, and thus an entire pathway comprising a minimum number of nodes from the m-th node to the n-th node is determined.

Here again, it is possible to refine the process in the three ways noted earlier;

According to another aspect of the invention, corresponding to the third object cited above, the invention provides a process of establishing a routing table localized in a node of the network, for example the m-th node. The process comprises the stages of the preceding process repeated a maximum of p−2 times for all the pathways which can be initiated from the m-th node.

The table contains only the first node to be used for each destination node.

The process is repeated each time there is a modification of the network.

In the case of a telephone network, the information of any modification of the network can be transmitted to all nodes by any suitable signalling means.

In another of its broad aspects, the invention provides a circuit for determining the last intermediate node of a path from the m-th node to the n-th node of a network through the minimum possible number of intermediate nodes. The circuit may comprise:

a detector of direct links;

a circuit connected to the detector output to establish the matrix $R_1$;

a memory in which are stored the matrix $R_1$ and the m-th row of the matrix $R_q$;

means for reading the memory and for comparison of the elements of the same rank in the m-th row of the matrix $R_q$ and the n-th column of the matrix $R_1$ to determine the rank of nonzero elements found;

a circuit placing in memory the address corresponding to the rank of a nonzero element determined by the reading and comparison means;

a counter for incrementing the value of q by one if there is no common nonzero element of the same rank in the said row and column;

a circuit for establishing the m-th line of the matrix $X_{q+q}$; and a circuit for establishing the m-th line of the matrix $X_{q+1}$ and having an output connected to the first mentioned memory, the previously stored m-th line of matrix $R_q$ thus being replaced by the m-th line of matrix $R_{q+1}$;

In yet another of its broad aspects, the invention provides apparatus for establishing a localized table at the m-th node for the routing of messages from the m-th node to the other nodes n of a network, the apparatus comprising:

detector means for determining all direct links between nodes of said network;

first circuit means connected to said detector means for establishing a square matrix $R_1 = \| a_{ij} \| _p{}^p$ such that $a_{ij}=0$ if there is no direct link from the i-th node to the j-th node and $a_{ij} \neq 0$ if such a direct link exists;

node determining means including memory means connected to said first circuit means for storing elements of matrix $R_1$ and elements of the m-th row of a matrix $R_q$, q being a positive whole number initially equal to 1, memory-read/comparison means connected to said memory means and operable to compare elements of equal rank in the m-th row of matrix $R_q$ and for another node n the n-th column of matrix $R_1$, with the existence of non-zero elements of equal rank indicating the existence of a pathway of q+1 links from the m-th node to the n-th node and the rank of such non-zero elements indicating the address of the last intermediate node of said pathway of q+1 links, and means coupled to an output of said memory-read/-comparison means and to an input of said memory means for incrementing q by a count of 1 in the absence of such non-zero elements for a given node n and given q and including calculating circuit means for calculating the square matrix $X_q = \| x_{ij} \|_p{}^p$ which is equal to the product of matrices $R_{q-1}$ and $R_1$ and matrix determining circuit means for determining the square matrix $R_q = \| b_{ij} \|_p{}^p$ such that $b_{ij} \neq 0$ if $x_{ij}$ or $a_{ij}$ is other than zero and $b_{ij}=0$ if $x_{ij}$ and $a_{ij}$ are both zero;

second circuit means coupled to an output of said node determining means for causing said node determining means to determine in reverse succession each node preceding said last intermediate node in said pathway in the same manner as said last intermediate node was determined, until the first intermediate node of said pathway has been determined; and storage means connected to an output of said second circuit means for storing addresses of first intermediate nodes determined as aforesaid.

The invention will be better understood, and other goals, advantages and characteristics of the invention will become more clear, by means of the description which follows, given by way of non-limitational example, taken together with the accompanying drawing.

DETAILED DESCRIPTION OF THE INVENTION

Figure 1:
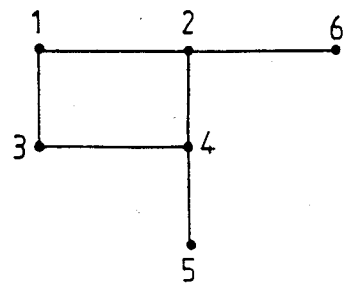
FIG. 1 represents schematically a simple network with bidirectional links and comprising six nodes.

FIG. 1 shows a network with six nodes, numbered 1 to 6, interconnected by direct links between nodes 1 and 2, 2 and 6, 2 and 4, 1 and 3, 3 and 4, and 4 and 5. The invention's method of determining a last intermediate node will now be described, using the FIG. 1 network for illustrative purposes.

The network of FIG. 1 may be represented by the square matrix $R_1 = \| a_{ij} \|_6{}^6$ such that $a_{ij}=0$ if there is no direct link from the i-th node to the j-th node, and $a_{ij}=1$ if there is a direct link. Thus is obtained:

$$R_1 = \begin{vmatrix} 1 & 1 & 1 & 0 & 0 & 0 \\ 1 & 1 & 0 & 1 & 0 & 1 \\ 1 & 0 & 1 & 1 & 0 & 0 \\ 0 & 1 & 1 & 1 & 1 & 0 \\ 0 & 0 & 0 & 1 & 1 & 0 \\ 0 & 1 & 0 & 0 & 0 & 1 \end{vmatrix}$$

When a direct link does not exist, one can determine whether there exists at least one two-link pathway from the m-th node to the n-th node, by comparing the elements of the same rank in the m-th row and the n-th column. Since this matrix is symmetric, because the links are bidirectional, the comparison is simplified.

In this example, there is no direct link from the first node to the sixth node. In order to determine whether there exists at least one two-link pathway from the first node to the sixth node, the elements of the same rank of the first and sixth rows (or columns) of the matrix are compared: 111000 and 010001. It will be seen that the foregoing sequences have one common nonzero element, and that this element is the second (i.e., both elements of the second tank are "1"). It can thus be concluded that there exists a two-link pathway from the first node to the sixth node, passing through the second node.

As a further illustration, there is also no direct link from the first node to the fifth node. To determine whether there exists a two-link pathway, the elements of the same rank of the first and fifth rows of the matrix are compared: 111000 and 000110. These sequences do not have a common nonzero element. It may thus be concluded that there is no two-link pathway from the first node to the fifth node. In accordance with the invention, the existence of a three-link pathway (if any) may be determined using the matrix $X_1$ which is equal to the product $R_{2-1} \cdot R_1$, or $R_1^2 = \| x_{ij} \|_6^6$. Because of the symmetry of $R_1$, the calculation of $X_2$ is simple. Also, as will be seen shortly, the only important elements of this matrix $X_2$ are those corresponding to the zero elements of the matrix $R_1$.

In the present example, the following matrix is obtained, in which the symbol x designates a nonzero element:

$$X_2 = \begin{vmatrix} x & x & x & x & 0 & x \\ x & x & x & x & x & x \\ x & x & x & x & x & 0 \\ x & x & x & x & x & x \\ 0 & x & x & x & x & 0 \\ x & x & 0 & x & 0 & x \end{vmatrix}$$

Using $X_2$, it is possible to establish the matrix $R_2 = b_{ij}$ such that $b_{ij} = 1$ if $x_{ij}$ or $a_{ij}$ is other than zero, and $b_{ij} = 0$ is $x_{ij}$ ad $a_{ij}$ are both zero.

$$R_2 = \begin{vmatrix} 1 & 1 & 1 & 1 & 0 & 1 \\ 1 & 1 & 1 & 1 & 1 & 1 \\ 1 & 1 & 1 & 1 & 1 & 0 \\ 1 & 1 & 1 & 1 & 1 & 1 \\ 0 & 1 & 1 & 1 & 1 & 0 \\ 1 & 1 & 0 & 1 & 0 & 1 \end{vmatrix}$$

Given $R_2$, the existence of a three-link pathway from node 1 to node 5 may be ascertained by comparing the elements in the first row of $R_2$ with those of equal rank in the fifth column of $R_1$: 111101 and 000110. It is found that the fourth element is a common nonzero element, and this confirms that existence of a three-link pathway from node 1 to node 5 in which the last intermediate node is the fourth node.

The complete three-link pathway from node 1 to node 5 may then be determined from the fact that between the fourth node and the first node there are only two links. The matrix $R_1$ is used, and comparison is made of the same rank elements of the first row and fourth row (or column): 111000 and 011110. It is found that two pathways are possible, because the second and third elements are common nonzero elements. In conclusion, to proceed from the first node to the fifth node, it is necessary first to pass through the second or the third node, and then to pass through the fourth node.

In the example of FIG. 1, the links are not directional, and transmissions can be conducted in either direction. For this reason, the matrices $R_1$ and $X_q$ are symmetrical, and the calculations can be simplified. In particular only the elements $x_{ij}$ of $X_q$ for values of i less than j, or values of j less than i need be determined.

Figure 2:
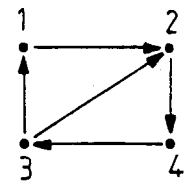
FIG. 2 represents schematically a simple network with directional links and comprising four nodes.

FIG. 2 shows an example of a a network of four nodes, numbered 1 through 4, in which the links are directional. In this case, representative matrix $R_1$ is not symmetrical.

$$R_1 = \begin{vmatrix} 1 & 1 & 0 & 0 \\ 0 & 1 & 0 & 1 \\ 1 & 1 & 1 & 0 \\ 0 & 0 & 1 & 1 \end{vmatrix}$$

With the same reasoning as above, it will be seen, for example, that to proceed from the first node to the fourth node, there is only a single two-link pathway passing through the second node; that to proceed from the fourth node to the second, there is only one two-link pathway passing through the third node; and that no two-link pathway exists from the second to the first node. To determine whether a three-link pathway from node 2 to node 1 is present, the matrices $X_2$ and $R_2$ must be considered.

$X_2$ and $R_2$ for the FIG. 2 network as:

$$X_2 = \begin{vmatrix} x & x & 0 & x \\ 0 & x & x & x \\ x & x & x & x \\ x & x & x & x \end{vmatrix} \text{ and } R_2 = \begin{vmatrix} 1 & 1 & 0 & 1 \\ 0 & 1 & 1 & 1 \\ 1 & 1 & 1 & 1 \\ 1 & 1 & 1 & 1 \end{vmatrix}$$

With the same reasoning applied in connection with FIG. 1, it is found that the desired three-link pathway from the second node to the first node exist and that the last intermediate node of the three-link pathway is the third node, and then, with $R_1$, it is found that the preceding node is the fourth. Thus, to proceed from the second node to the first node, it is necessary to pass first through the fourth node, and then through the third node.

Using the techniques described above, it is possible to establish a general routing table among all the nodes of a network by determining for each node of the network a localized routing table. The routing table is determined by repeating the stages of the process for determination of a pathway comprising a minimum number of nodes. Notably, to great practical advantage, the routing table can easily be modified in the event of a modification of the network, be it by disappearance or appearance of a node, or by breakage or creation of a link, or by saturation of a node or a link.

Figure 3:
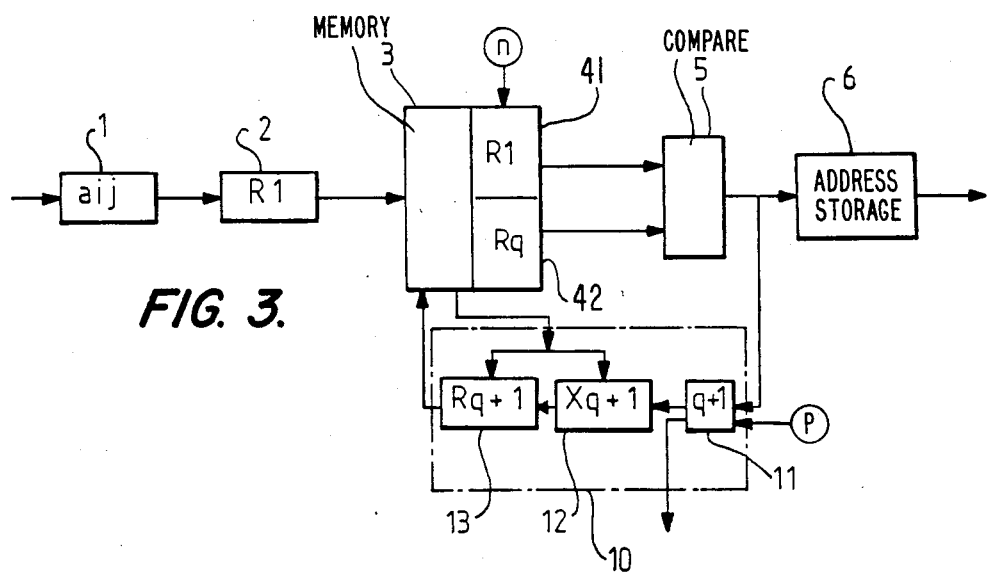
FIG. 3 represents schematically a circuit for determination of the last intermediate node of a pathway comprising a minimum number of nodes from the m-th node to the n-th node of a network.

FIG. 3 illustrates schematically a circuit enabling determination of the last intermediate node of a pathway comprising a minimum number of nodes to proceed from the m-th node to the n-th node in a network comprising p nodes interconnected by a number of links (p being a positive whole number). The circuit is included in the electronics situated at the m-th node, and it is assumed that there is no direct link from the m-th node to the n-th node. The circuit includes first a detector 1, by which direct links are determined, i.e. the elements $a_{ij}$ of the matrix $R_1$. A circuit 2 connected to the detector 1 establishes the direct-link matrix $R_1$ based on the detector circuit output. The output of the circuit 2 is connected to a memory 3 for storing at least the matrix $R_1$ and the last calculated m-th row of the matrix $R_q$. This memory 3 is provided at its output with a reading mechanism 41, 42 which reads from the memory respective elements of the n-th row of $R_1$ (when there is indication at the element 41 of the address of the n-th node where the message is to be sent) and, and of the m-th row of the matrix $R_q$, it being understood that the circuit is localized in the m-th node. The two outputs of this reading mechanism 41, 42 are connected to the circuit 5 enabling successive comparison of the elements of the same rank of the row and column extracted from the memory 3, and determination of the rank of nonzero elements. A circuit 6 connected to the circuit 5 places in memory all addresses i corresponding to the rank of a nonzero element determined by the circuit 5, i thus being the address of a last intermediate node of a pathway from the m-th node to the n-th node, with q+1 links.

Reference number 10 designates a calculating unit If the circuit 5 does not detect any nonzero elements, a counting circuit 11 of unit 10 increments by one the value of q, initially equal to one, and compares it with p. If q is equal to p, then no pathway exists to proceed from the m-th node to the n-th node, and the circuit produces no result. Otherwise, a circuit 12 of unit 10 calculates the m-th row of the matrix $X_{q-1}$, from the matrix $R_1$ and the m-th row of the matrix $X_q$ stored in the memory 3. A circuit 13 then determines the m-th row of the matrix $R_{q+1}$ from the matrix $R_1$ stored in the memory 3 and the m-th row of the matrix $X_{q+1}$ previously calculated. The calculated row of matrix $R_{q+1}$ is placed in the memory 3 to replace the m-th row of the matrix $R_q$, and the circuit 5 performs a comparison.

As long as q is less than p, the cycle can be repeated until at the output of the circuit 5 there has been established the rank of a nonzero element common to the row and column extracted from the memory 3.

Figure 4:
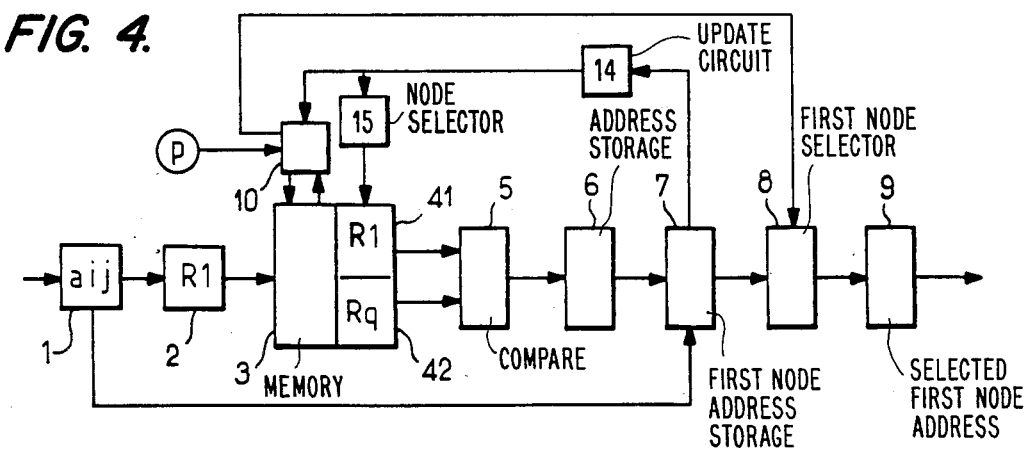
FIG. 4 represents schematically a circuit for establishing of a routing table localized in one node of a network.

FIG. 4 schematically represents a circuit enabling the establishment of a routing table localized in a node of the network, in particular the m-th node.

Such a circuit enables determination of a pathway comprising a minimum number of nodes to proceed from the m-th node to another node of the network, for all nodes of the network consisting of p nodes interconnected by a number of links (p being a positive whole number).

The principle of operation of the FIG. 4 circuit will now be described. A set N is maintained which contains all nodes for which there has yet to be determined the first node of a pathway from node m having the minimum possible number of links. With q fixed, for each node of N requiring a pathway of q+1 links, the last intermediate node of each such pathway is determined. The addresses of the nodes thus determined are stored in memory, and may be used to determine the addresses of the first intermediate nodes of the corresponding pathways. N is updated each time one of its elements has been considered. When all the elements of N have been considered once, and if N still contains other elements, q is incremented, and the cycle is repeated. This continues until the addresses of the first nodes of all pathways comprising a minimum number of nodes have been determined.

The circuit represented in FIG. 4 has components in common with those of FIG. 3 which are represented by the same numbers. It includes first a detector 1 by which direct links are determined, i.e. the elements $a_{ij}$ of the matrix $R_1$, which is established by the circuit 2 connected to the detector 1. The output of the circuit 2 is connected to a memory 3 in which are stored at least the matrix $R_1$ and the last calculated m-th row of the matrix $R_q$. This memory 3 is provided at its output with a reading mechanism 41,42. The reading mechanism extracts the respective elements of the n-th column of $R_1$ from memory 3 when there is indication, at the part 41 of the mechanism, of the address of the n-th node to which the message is to be sent. The reading mechanism also extracts the elements of the m-th row of the matrix $R_q$, it being understood that the circuit is localized at the m-th node. The two outputs of this reading mechanism 41, 42 are connected to the circuit 5 enabling successive comparison of the elements of the same rank of the row and column extracted from the memory 3, and determination of the rank of such common elements which are nonzero. A circuit 6, connected to the output of the circuit 5, places in memory all addresses i corresponding to the rank of a nonzero element determined by the circuit 5, i thus corresponding to the address of a last intermediate node of a pathway from the m-th node to the n-th node with q+1 links.

The circuit 6 thus contains the addresses of the last intermediate node of each determined pathway with a minimum number of nodes, to proceed from the m-th node to another node of the network.

The circuit 6 is connected to a circuit 7 which calculates and stores the address of the first node of each determined pathway with a minimum number of nodes from the node m to another node of the network. These addresses are determined by iterative searching based on the data of the circuit 6.

The detector 1 is connected to the circuit 7 so that the circuit stores all direct pathways.

The circuit 7 is also connected to a unit 14 which updates the set N of all the nodes n for which the first node of a pathway with a minimum number of nodes from the m-th node has not yet been determined.

A unit 15 selects values of n until all values of the set N have been exhausted. When all values of set N have been run through, if any elements remain in the set, unit 11 increments by one unit the value of q, initially equal to one, and compares it with p. If q is equal to p, then there exists no pathway to proceed from the m-th node to such remaining nodes of N. The unit 11 so informs a circuit 8, to which it is also connected.

If q is less then p, unit 10 calculates the m-th row of the matrix $X_{q-1}$ at 12, from the matrix $R_1$ and the m-th row of the matrix $X_q$ stored in the memory 3, and then the m-th row of the matrix $R_{q+1}$ at 13, from the matrix $R_1$ stored in the memory 3 and the m-th row of the matrix $X_{q+1}$ previously calculated. The cycle continues as long as N still contains elements, and q is strictly less than p.

The circuit 7 is also connected to the circuit 8.

When N contains no more elements, or q is equal to p, for each node n reachable from the m-th node by multiple minimum pathways with different first nodes, the circuit 8 selects one of these first nodes, according to criteria of frequency, of traffic, or any appropriate.

The circuit 8 is itself connected to a circuit 9 which stores the selected first node, and which forms the routing table at the m-th node. To determine the general routing table across the network, it is sufficient to establish for all the other nodes of the network a localized routing table, as has just been described for the m-th node.

Although only certain modes of embodiment of the invention have been described, it is obvious that any modification in the same spirit brought about by those skilled in the art shall not constitute a departure from the scope of the present invention.

I claim:

1. In a network of p nodes interconnected by a number of links, p being a positive whole number, a method for determining the last intermediate node of a pathway from the m-th node to the n-th node through the minimum possible number of nodes, said method being especially useful for communications routing between interconnected computers and between interconnected telephone switchboard systems and comprising the steps of:
   (a) electronically determining all direct links between nodes of said network;
   (b) electronically establishing a square matrix $R_1 = \| a_{ij} \|_p^p$ and storing the matrix $R_1$ in a memory device, $a_{ij}$ being assigned a value of zero if there is no direct link between the i-th node and the j-th node of the network and being assigned a non-zero value if there is such a direct link,
   (c) determining whether there is a two-link pathway from the m-th node to the n-th node by electronically comparing elements of equal rank in the m-th row and n-th column of the matrix $R_1$, the existence of non-zero elements of equal rank indicating the presence of a two-link pathway and the rank of such non-zero elements indicating the location of an intermediate node of that pathway; and
   (d) in the absence of a two-link pathway, iterating the following steps over all q from 2 to p−2 until a pathway of q+1 links from the m-th node to the n-th node has been determined:
      (1) electronically establishing elements of the square matrix $X_q = \| x_{ij} \|_p^p$, which is the product of the matrices $R_{q-1}$ and $R_1$;
      (2) electronically establishing elements of the square matrix $R_q = \| b_{ij} \|_p^p$, $b_{ij}$ being assigned a non-zero value if one of $x_{ij}$ and $a_{ij}$ is non-zero and being assigned a value of zero if $x_{ij}$ and $a_{ij}$ are both zero, and
      (3) electronically comparing elements of equal rank in the m-th row of matrix $R_q$ and the n-th column of matrix $R_1$, the existence of non-zero elements of the same rank indicating the presence of said pathway of q+1 links from the m-th node to the n-th node and the rank of such non-zero elements indicating the identity of the last intermediate node of such pathway.

2. The method of claim 1, wherein only elements of the square matrix $X_q$ corresponding to zero elements of matrix $R_{q-1}$ are established.

3. The method of claim 1, wherein if the links of said network are not directional, elements of matrix $X_q$ are established only for values $i<j$ or for values $j<i$.

4. The method of claim 1, wherein only elements of the m-th rows of matrices $X_q$ and $R_q$ are established for $q \geq 2$.

5. The method of claim 1, wherein the intermediate nodes of said pathway which precede said last intermediate node are determined in reverse succession by repeating steps (c) through (d) (3) as necessary first with respect to said last intermediate node and then with respect to each successively determined preceding node until all preceding intermediate nodes of said pathway have been determined.

6. The method of claim 5, wherein only elements of matrix $X_q$ corresponding to zero value elements of matrix $R_{q-1}$ are established.

7. The method of claim 6, wherein if the links of said network are not directional, elements of matrix $X_q$ are established only for values $i<j$ or values $j<i$.

8. The method of claim 5, wherein only elements of the m-th rows of matrices $X_q$ and $R_q$ are established for $q \geq 2$.

9. A method for establishing a localized routing table, comprising repeating the method of claim 5 up to p−2 times for each possible pathway traversing the minimum number of nodes from the m-th node to the n-node of said network, the resulting table being local to the m-th node and including an indication of the first intermediate node of each such possible pathway.

10. The method of claim 9, comprising repeating all of the aforesaid steps to update said table when the network configuration changes.

11. A method for establishing a general network routing table, comprising conducting the method of claim 9 for each node of the network.

12. In a network, such as a network of interconnected computers or a network of interconnected telephone switchboard systems, having p nodes interconnected by a number of links, p being a positive whole number, apparatus for determining the last intermediate node of a pathway from the m-th node to the n-th node of the network through the minimum possible number of nodes, comprising:
   detector means for detecting all direct links between nodes of said network;
   circuit means connected to said detector means for establishing a square matrix $R_1 = \| a_{ij} \|_p^p$, with $a_{ij}$ being assigned a value of zero if there is no direct link from the i-th node to the j-th node of the network and being assigned a non-zero value if such a direct link exists;
   memory means connected to said circuit means for storing elements of said matrix $R_1$;
   memory reading means connected with comparison means for determining whether there is a two-link pathway from the m-th node to the n-th node if a direct link therebetween does not exist, by comparing elements of equal rank in the m-th row and the n-th column of matrix R1, with the existence of non-zero elements of equal rank in the m-th row and n-th column of matrix R1 indicating the presence of said two-link pathway and the rank of such non-zero elements indicating the intermediate node of said two-link pathway, and means operable in the absence of such non-zero elements for determining by iteration over whole numbers q varying from 2 to p−2 whether a pathway of q+1 links exists from the m-th node to the n-th node, including calculating circuit means for calculating elements of the square matrix $X_q = \| x_{ij} \|_p$ which is the product of matrices $R_{q-1}$ and $R_1$, matrix determining circuit means connected to said calculating circuit circuit means connected to said calculating circuit means for determining elements of the square matrix $R_q = \| b_{ij} \|_p$ such that $b_{ij}=0$ if $x_{ij}$ and $a_{ij}$ are both zero and $b_{ij}\neq 0$ if $x_{ij}$ or $a_{ij}$ is other than zero, and means connected to said matrix determining circuit means and to said memory means for comparing elements of equal rank in the m-th row of matrix $R_q$ and the n-th column of matrix $R_1$, the existence of non-zero elements of equal rank in the n-th row of matrix $R_q$ and the n-th column of matrix $R_1$ indicating the presence of said pathway of q+1 links and the rank of such non-zero elements indicating the last intermediate node of said pathway of q+1 links.

13. Apparatus according to claim 12, wherein said calculating circuit means calculates only elements of matrix $X_q$ which correspond to zero elements of matrix $R_{q-1}$.

14. Apparatus according to claim 12, wherein if the links of said network are not directional, said calculating circuit means calculates elements of matrix $X_q$ only for values $i<j$ or for values $j<i$.

15. Apparatus according to claim 12, wherein said calculating circuit means calculates only elements of the m-th rows of matrices $X_q$ and $R_q$ for values of $q \geq 2$.

16. In a network, such as a network of interconnected computers or a network of interconnected telephone switchboard systems, having p nodes interconnected by a number of links, p being a positive whole number, apparatus for determining a localized routing table for the m-th node of the network, which table includes the adresses of the respective first nodes of pathways from the m-th node to the other nodes n of the network through the smallest possible numbers of intermediate nodes, said apparatus comprising:

detector means for determining all direct links between nodes of said network;

first circuit means connected to said detector means for establishing a square matrix $R_1 = \| a_{ij} \|_p$ such that $a_{ij}=0$ if there is no direct link from the i-th node to the j-th node and $a_{ij}\neq 0$ if such a direct link exists;

node determining means including memory means connected to said first circuit means for storing elements of matrix $R_1$ and elements of the m-th row of a matrix $R_q$, q being a positive whole number initially equal to 1, memory-read/comparison means connected to said memory means and operable to compare elements of equal rank in the m-th row of matrix $R_q$ and for another node n the n-th column of matrix $R_1$, with the existence of non-zero elements of equal rank indicating the existence of a pathway of q+1 links from the m-th node to the n-th node and the rank of such non-zero elements indicating the address of the last intermediate node of said pathway of q+1 links, and means coupled to an output of said memory-read/comparison means and to an input of said memory means for incrementing q by a count of 1 in the absence of such non-zero elements for a given node n and a given q and including calculating circuit means for calculating elements of the square matrix $X_q = \| x_{ij} \|_p$ which is equal to the product of matrices $R_{q-1}$ and $R_1$ and matrix determining circuit means for determining elements of the square matrix $R_q = \| b_{ij} \|_p$ such that $b_{ij}\neq 0$ if $x_{ij}$ or $a_{ij}$ is other than zero and $b_{ij}=0$ if $x_{ij}$ and $a_{ij}$ are both zero;

second circuit means connected to said node determining means for causing said node determining means to determine in reverse succession each node preceding said last intermediate node in said pathway in the same manner as said last intermediate node was determined, until the first intermediate node of said pathway has been determined; and storage means connected to an output of said second circuit means for storing addresses of first intermediate nodes determined as aforesaid.

17. Apparatus according to claim 16, wherein said second circuit means operates to cause said node determining means to determine the first intermediate node of each pathway from the m-th node to each other node n through the smallest possible number of links, and including selector/storage circuit means coupled to said storage means for selecting and storing the first intermediate node of one such pathway for each node n.

* * * * *